US009459830B2

United States Patent
Hu

(10) Patent No.: US 9,459,830 B2
(45) Date of Patent: Oct. 4, 2016

(54) METHOD AND APPARATUS FOR RECOVERING MEMORY OF USER PLANE BUFFER

(71) Applicant: HUAWEI TECHNOLOGIES CO., LTD., Shenzhen, Guangdong (CN)

(72) Inventor: Jianbo Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 419 days.

(21) Appl. No.: 14/061,839

(22) Filed: Oct. 24, 2013

(65) Prior Publication Data
US 2014/0052874 A1  Feb. 20, 2014

Related U.S. Application Data

(63) Continuation of application No. PCT/CN2011/073300, filed on Apr. 26, 2011.

(51) Int. Cl.
| | |
|---|---|
| *G06F 5/14* | (2006.01) |
| *H04L 12/801* | (2013.01) |
| *H04L 29/14* | (2006.01) |
| *H04W 80/02* | (2009.01) |
| *H04W 24/04* | (2009.01) |
| *H04W 88/02* | (2009.01) |

(52) U.S. Cl.
CPC ............... *G06F 5/14* (2013.01); *H04L 47/29* (2013.01); *H04L 69/40* (2013.01); *H04W 24/04* (2013.01); *H04W 80/02* (2013.01); *H04W 88/02* (2013.01)

(58) Field of Classification Search
USPC ....... 709/234, 203, 224, 217, 200, 235, 227, 709/250, 221
See application file for complete search history.

(56) References Cited

U.S. PATENT DOCUMENTS

| | | | | |
|---|---|---|---|---|
| 7,072,341 B2* | 7/2006 | Xu | ......................... | H04L 29/125 370/353 |
| 7,818,450 B2* | 10/2010 | Chen | ....................... | H04L 45/02 370/351 |
| 2005/0180467 A1* | 8/2005 | Kim | ........................ | H04H 20/28 370/536 |

(Continued)

FOREIGN PATENT DOCUMENTS

| | | |
|---|---|---|
| CN | 1761356 | 4/2006 |
| CN | 1936859 | 3/2007 |

(Continued)

OTHER PUBLICATIONS

Chinese Office Action dated Jan. 4, 2013 in corresponding Chinese Patent Application No. 201180000390.7.

(Continued)

*Primary Examiner* — Jude Jean Gilles
(74) *Attorney, Agent, or Firm* — Staas & Halsey LLP

(57) ABSTRACT

The present invention discloses a method and an apparatus for recovering a memory of a user plane buffer and relates to the communication field. The method and apparatus are used to recover the memory of the user plane buffer immediately and quickly. The method for recovering a memory of a user plane buffer includes: monitoring memory usage of a buffer in real time; when the memory usage of the buffer is greater than or equal to a preset threshold, releasing the memory of the buffer, where the preset threshold is smaller than a memory capacity of the buffer. The solution of the present invention is applicable to any scenario where the memory of the buffer needs to be recovered.

10 Claims, 6 Drawing Sheets

(56) References Cited

U.S. PATENT DOCUMENTS

| | | | | |
|---|---|---|---|---|
| 2006/0067311 | A1* | 3/2006 | Ogata | H04L 49/90 370/371 |
| 2007/0297453 | A1* | 12/2007 | Niinomi | G06F 13/102 370/474 |
| 2008/0049657 | A1* | 2/2008 | Feng | H04B 7/26 370/315 |
| 2010/0241788 | A1* | 9/2010 | Yeh | G06F 12/0246 711/103 |
| 2010/0296449 | A1* | 11/2010 | Ishii | H04L 1/1874 370/328 |
| 2010/0302919 | A1* | 12/2010 | Ling | G11B 20/10527 369/30.23 |

FOREIGN PATENT DOCUMENTS

| | | |
|---|---|---|
| CN | 101833512 | 9/2010 |
| EP | 1777892 | 4/2007 |
| WO | 2005/006195 | 1/2005 |

OTHER PUBLICATIONS

PCT International Search Report and Written Opinion of the International Searching Authority dated Jan. 26, 2012 in corresponding International Patent Application No. PCT/CN2011/073300.

"LTE; Evolved Universal Terrestrial Radio Access (E-UTRA); Medium Access Control (MAC) protocol specification (3GPP TS 36.321 version 9.3.0 Release 9)", ETSI TS 136 321 V9.3.0 (Jul. 2010).

"LTE; Evolved Universal Terrestrial Radio Access (E-UTRA); Radio Link Control (RLC) protocol specification (3GPP TS 36.322 version 9.3.0 Release 9)", ETSI TS 136 322 V9.3.0 (Oct. 2010).

"LTE; Evolved Universal Terrestrial Radio Access (E-UTRA); Packet Data Convergence Protocol (PDCP) specification (3GPP TS 36.323 version 9.0.0 Release 9)".

"LTE; Evolved Universal Terrestrial Radio Access (E-UTRA); Radio Resource Control (RRC); Protocol specification (3GPP TS 36.331 version 9.3.0 Release 9)", ETSI TS 136 331 V9.3.0 (Jul. 2010).

* cited by examiner

<Prior Art>

<Prior Art>

METHOD AND APPARATUS FOR RECOVERING MEMORY OF USER PLANE BUFFER

CROSS-REFERENCE TO RELATED APPLICATIONS

This application is a continuation of International Application No. PCT/CN2011/073300, filed on Apr. 26, 2011, which is hereby incorporated by reference in its entirety.

FIELD OF THE INVENTION

The present invention relates to the communication field, and in particular, to a method and an apparatus for recovering a memory of a user plane buffer.

BACKGROUND OF THE INVENTION

Poor conditions such as an increasing BLER (Block Error Ratio, block error rate), air interface packet loss, and increasing retransmissions may occur on an LIE (Long Term Evolution, long term evolution) network in an adverse radio environment. As a result, a large amount of data is buffered by a UE (User Equipment, user equipment) in a transmitting window, a receiving window, and a reordering window of the RLC (Radio Link Control, radio link control)/PDCP (Packet Data Convergence Protocol, packet data convergence protocol) of the layer 2 protocol (L2, that is, the data link layer protocol). In addition, different implementations of user plane memory management and different implementations of interfaces between the L2 protocol and external modules may also result in increasing memory usage of a buffer (Buffer).

However, considering factors such as cost reduction, volume, and power consumption, the memory of an L2 buffer used by an LTE UE is limited at a certain level. In an adverse radio environment, the data amount of the L2 buffer may reach or exceed the upper limit of the memory of the buffer, that is, the memory of the L2 buffer overflows. In this case, when uplink and downlink data continues to enter the L2 buffer, memory allocation fails. Once memory allocation fails, the user plane data transmission is interrupted exceptionally, and a more serious system exception may occur.

In the prior art, for the interruption of user plane data transmission due to the memory overflow of the L2 buffer, the following two recovery mechanisms are provided.

As shown in FIG. 1, in a process of communication between a UE and an eNB (evolved NodeB, evolved NodeB), after the overflow of the L2 buffer occurs, the number of uplink retransmissions of an RLC PDU (PDU is short for Protocol Data Unit, protocol data unit) reaches the maximum, and an RRC (Radio Resource Control, radio resource control) reestablishment procedure is triggered; the reestablishment procedure fails, and the RRC releases all RBs (Radio Bearer, radio bearer), so that the memory of the L2 buffer is recovered. The specific process is as follows:

11. When the L2 buffer overflows, new upper layer uplink data cannot be received.

12. The PDU in the uplink transmitting window of the RLC is retransmitted after a t-PollRetransmit timer (timer of the RLC) expires.

13. Because the L2 buffer overflows, an L2 MAC (Medium Access Control, medium access control) cannot receive the PDU reported by a PHY (Physical Layer, physical layer), that is, the RLC cannot receive a status PDU sent from the NodeB.

14. After the t-PollRetransmit timer expires, the uplink PDU of the RLC continues to be retransmitted until the maximum number of retransmissions is reached.

15. The RLC reports radio link failure signaling RLC_ERR_IND to the RRC.

16. The RRC initiates an RRC connection reestablishment procedure as specified in section 5.3.11 of 3GPP TS 36.331, and starts the T301 timer.

17. The L2 executes the reestablishment procedure. The L2 data continues to be buffered on the PDCP according to 3GPP TS 36.322 and 3GPP TS 36.323. However, because the L2 buffer cannot be released, the L2 data retransmission function is still unavailable, and the RRC connection reestablishment request fails to be sent.

18. After the RRC T301 expires, all the RBs are released as specified in section 5.3.7.7 and section 5.3.12 of 3GPP TS 36.331.

19. All the buffers of the L2 are released, that is, the memories of the buffers are recovered.

As shown in FIG. 2, in the process of communication between the UE and the eNB, after the L2 buffer overflows, the L2 data transmission is unavailable, and the eNB actively releases the UE; the state of the UE is inconsistent with that of the eNB, and the UE RRC is finally triggered to release all RBs, so that the L2 buffer is recovered. The specific process is as follows:

21. When the L2 buffer overflows, new uplink and downlink data cannot be received.

22. The eNB detects that the UE state is exceptional, and initiates an RRC connection release message to release the UE actively.

23. Because the L2 memory overflows, the RRC connection release message cannot be received, and the UE is still in a connected state.

24. Because the eNB has released the UE and the state of the UE is inconsistent with that of the eNB, the PHY detects an out-of-synchronization event and reports the event to the RRC; or the TA timeout may occur on the MAC, and the PHY reports the TA timeout to the RRC.

25. The RRC initiates a connection reestablishment procedure as specified in section 5.3.11 of 3GPP TS 36.331, and starts a T301 timer.

26. The L2 executes the reestablishment procedure. The data should continue to be buffered on the PDCP. However, because the PDCP cannot be released, the L2 data transmission function is still unavailable, and the RRC connection reestablishment request fails to be sent.

27. After the RRC T301 expires, all the RBs are released as specified in section 5.3.7.7 and section 5.3.12 of 3GPP TS 36.331.

28. All the buffers of the L2 are released, that is, the memories of the buffers are recovered.

The methods shown in FIG. 1 and FIG. 2 are conventional methods used for recovering memories when the memory of the L2 buffer of the UE overflows. In addition, the two methods depend on the protection of a related protocol timer, and exceptional releasing operations are performed after the timer expires. Because the duration of the related timer and exceptional processing procedures after the related timer expires should comply with the protocol, the whole recovery process may be complex. As a result, the memory recovery takes a long time, and the UE maintains an exceptional state for a long time.

SUMMARY OF THE INVENTION

Embodiments of the present invention provide a method and an apparatus for recovering a memory of a user plane buffer, which are used to recover the memory of the user plane buffer immediately and quickly.

To achieve the foregoing objective, embodiments of the invention adopt the following technical solution:

A method for recovering a memory of a user plane buffer includes:

monitoring memory usage of a buffer in real time; and when the memory usage of the buffer is greater than or equal to a preset threshold, releasing the memory of the buffer, where the preset threshold is smaller than a memory capacity of the buffer.

An apparatus for recovering a memory of a user plane buffer includes:

a monitoring unit, configured to monitor memory usage of a buffer in real time;

a determining unit, configured to determine whether the memory usage of the buffer is greater than or equal to a preset threshold, where the preset threshold is smaller than a memory capacity of the buffer; and a releasing unit, configured to release the memory of the buffer in a case that a determining result of the determining unit is true.

By using the method and apparatus for recovering the memory of the user plane buffer according to embodiments of the present invention, a threshold is set for the memory usage of the buffer, and the threshold is smaller than the memory capacity of the buffer, so that when the memory usage of the buffer reaches or exceeds the threshold, the memory of the buffer is released. However, in the prior art, the memory of the buffer is released only in a case that the buffer overflows and a related timer expires. Compared with the prior art, the solution provided by the present invention has a simpler procedure and can recover the memory of the user plane buffer immediately and quickly.

BRIEF DESCRIPTION OF THE DRAWINGS

To illustrate the technical solution in the embodiments of the present invention or the prior art more clearly, the accompanying drawings to be used in the description of the embodiments of the present invention or the prior art are briefly described in the following. Apparently, the accompanying drawings in the following description shows only some embodiments of the present invention and persons of ordinary skill in the art can derive other drawings from these accompanying drawings without creative efforts.

DETAILED DESCRIPTION OF THE EMBODIMENTS

The technical solution provided in embodiments of the present invention is hereinafter described clearly and completely with reference to the accompanying drawings. Apparently, the embodiments described below are only some rather than all of the embodiments of the present invention. All other embodiments that persons of ordinary skill in the art obtain based on embodiments of the present invention without creative efforts fall within the scope of the present invention.

In a process of communication between a UE and an eNB, to recover a memory of a user plane buffer immediately and quickly, an embodiment of the present invention provides a method for recovering the memory of the user plane buffer. The executor of the method may be a functional module of a UE (User Equipment, UE for short) or a functional module of a NodeB (evolved Node B, eNB for short). The following embodiments are illustrated with a method for recovering the memory of the user plane buffer of an LIE UE being an example. In this case, the executor of the method may be a functional module of the UE.

Because the user plane buffer includes a buffer of a data link layer, the embodiments of the present invention are illustrated with a method for recovering the memory of the buffer of the data link layer being an example. The data link layer generally includes: PDCP (Packet Data Convergence Protocol, Packet Data Convergence Protocol), RLC (Radio Link Control, radio link control), and MAC (Medium Access Control, medium access control). There may be only one buffer at the data link layer. Certainly, there may also be multiple buffers at the data link layer, for example, the three protocols of the data link layer may correspond to respective buffers, that is, a PDCP buffer, an RLC buffer, and a MAC buffer.

Figure 1:
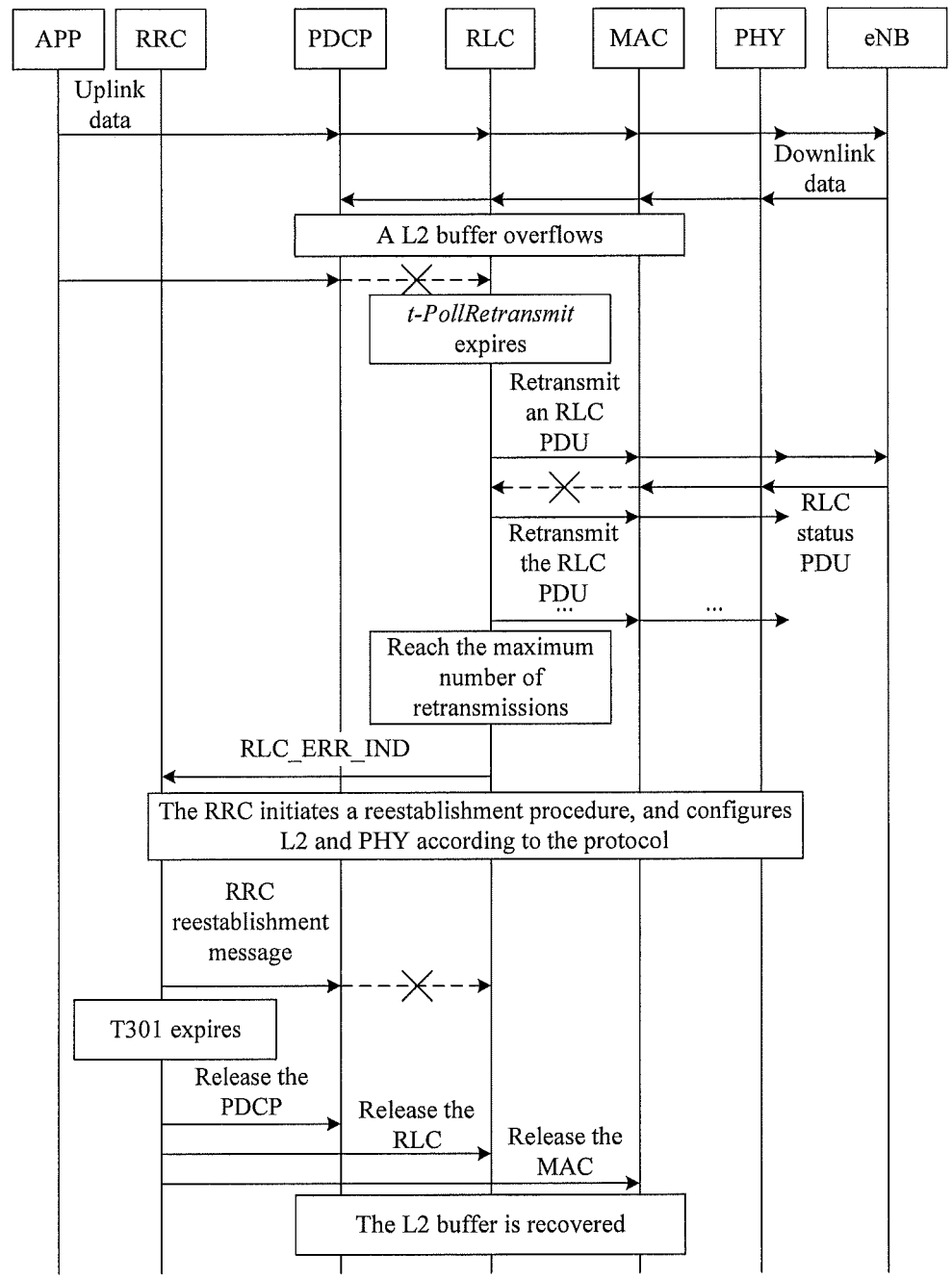
FIG. 1 is a flowchart of a method for recovering a memory of a user plane buffer in the prior art.
Figure 2:
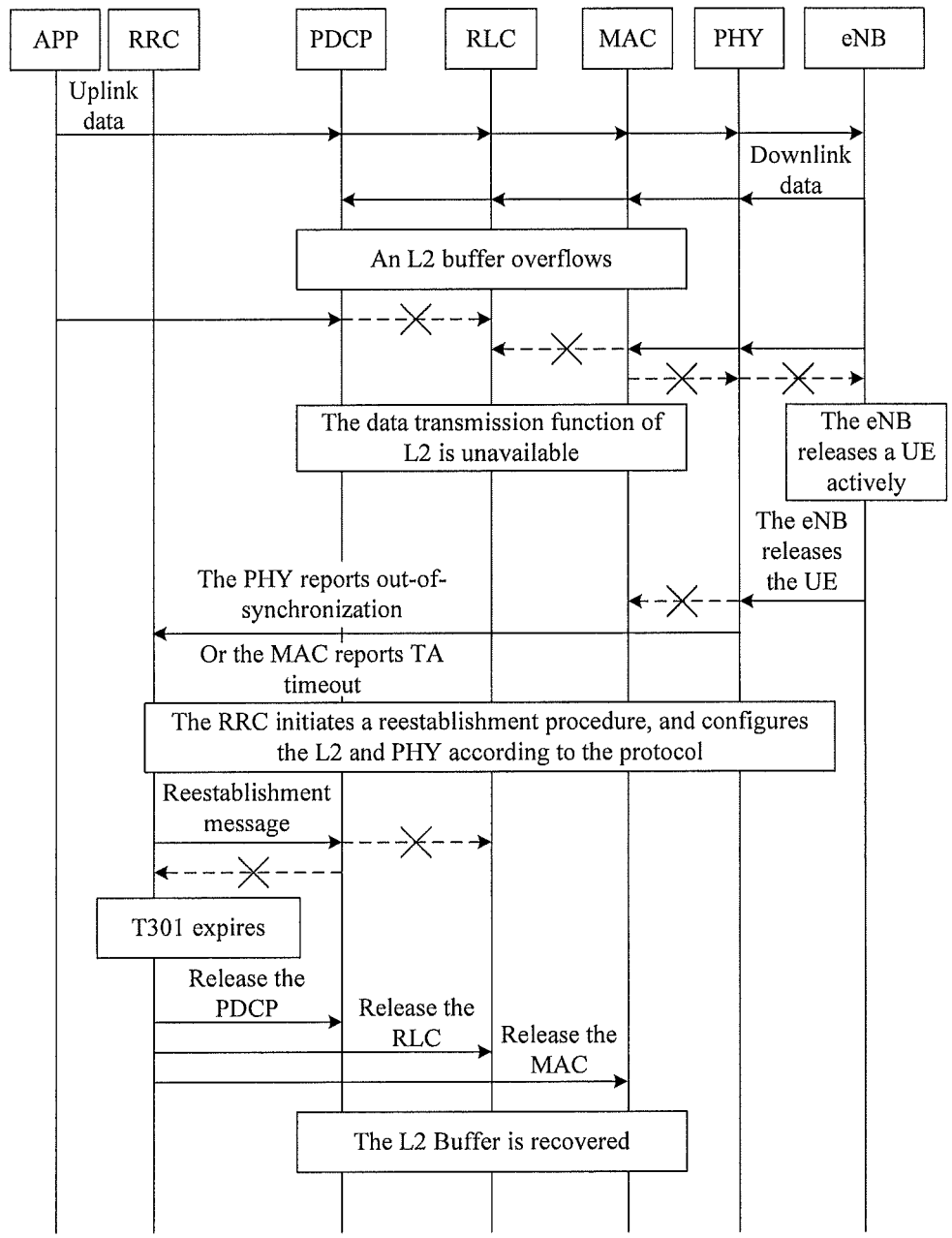
FIG. 2 is a flowchart of another method for recovering a memory of a user plane buffer in the prior art.
Figure 3:
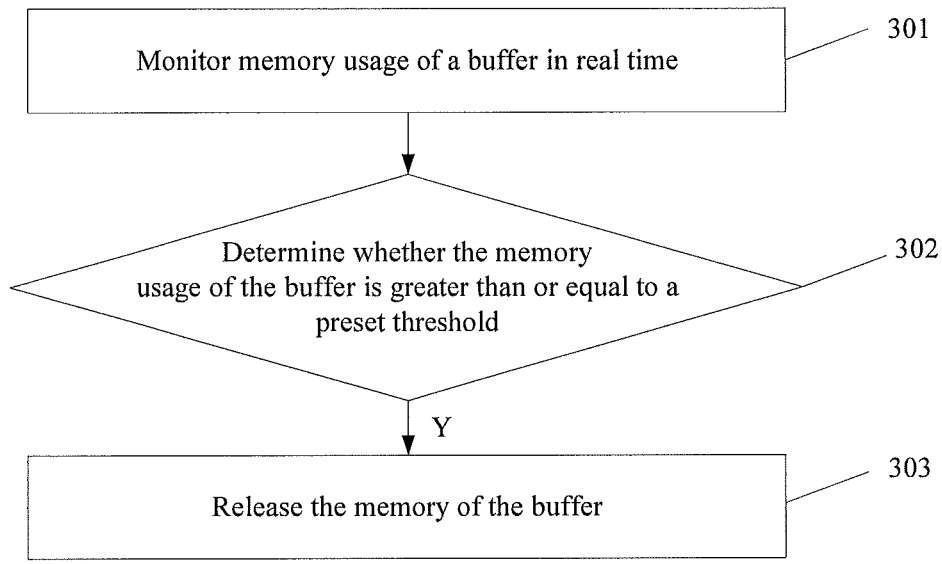
FIG. 3 is a schematic diagram of a method for recovering a memory of a user plane buffer according to an embodiment of the present invention.

If only one buffer exists at the data link layer of the LTE UE, as shown in FIG. 3, the method may include the following steps:

301: Monitor the memory usage of the buffer in real time.

For example, in this step, the memory usage of the buffer of the data link layer may be monitored in real time at an uplink data entrance or a downlink data entrance or another entrance of the data link layer.

The uplink data entrance may be a PDCP entrance, the downlink data entrance may be a MAC entrance, and the other entrance may be an RLC entrance.

302: Determine whether the memory usage of the buffer is greater than or equal to a preset threshold.

A threshold is preset for the buffer of the data link layer, where the threshold should be smaller than the memory capacity of the buffer. The memory capacity of the buffer is also the maximum memory usage of the buffer. If the memory usage of the buffer is greater than the memory capacity of the buffer, the memory of the buffer overflows.

In this embodiment of the present invention, in the process of comparing the memory usage of the buffer with the preset threshold, the memory of the buffer is determined to be exceptional so long as the memory usage of the buffer is greater than or equal to the preset threshold no matter whether the memory of the buffer overflows.

303: If it is determined that the memory usage of the buffer is greater than or equal to a preset threshold in step 302, release the memory of the buffer.

The memory of the buffer is released, that is, the memory of the buffer is recovered.

Preferably, step 301 may be:

when uplink data reaches the uplink data entrance of the data link layer, checking the memory usage of the buffer of the data link layer at the uplink data entrance; that is, when the uplink data reaches the PDCP entrance of the data link layer, checking the memory usage of the buffer of the data link layer at the PDCP entrance; or, when downlink data reaches the downlink data entrance of the data link layer, checking the memory usage of the buffer of the data link layer at the downlink data entrance; that is, when the downlink data reaches the MAC entrance of the data link layer, checking the memory usage of the buffer of the data link layer at the MAC entrance; or, when uplink data/downlink data reaches the other entrance of the data link layer, checking the memory usage of the buffer of the data link layer at the other entrance; that is, when the uplink data or downlink data reaches the RLC entrance of the data link layer, checking the memory of the buffer of the data link layer at the RLC entrance.

Figure 4:
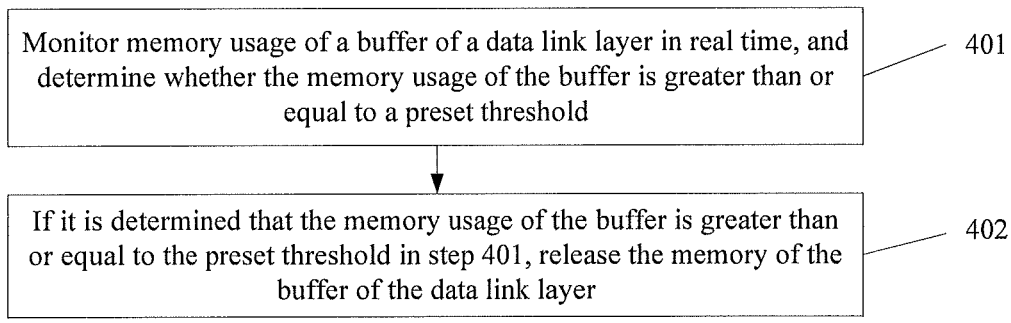
FIG. 4 is a schematic diagram of another method for recovering a memory of a user plane buffer according to an embodiment of the present invention.

If three buffers, namely, the PDCP buffer, RLC buffer, and MAC buffer, exist at the data link layer of the LIE UE, as shown in FIG. 4, the method specifically includes the following steps:

401: Monitor the memory usage of the buffer of the data link layer in real time, and determine whether the memory usage of the buffer is greater than or equal to the preset threshold.

Because three buffers exist at the data link layer, each buffer has a respective memory capacity. In this embodiment of the present invention, a threshold is preset for each buffer. For each buffer, the preset threshold is smaller than the memory capacity of the buffer.

Step 401 may be: monitoring the memory usage of the PDCP buffer in real time at the PDCP entrance, and determining whether the memory usage of the PDCP buffer is greater than or equal to the preset threshold of the PDCP buffer; or, monitoring the memory usage of the MAC buffer in real time at the MAC entrance, and determining whether the memory usage of the MAC buffer is greater than or equal to the preset threshold of the MAC buffer; or, monitor the memory usage of the RLC buffer in real time at the RLC entrance, and determining whether the memory usage of the RLC buffer is greater than or equal to the preset threshold of the RLC buffer.

Preferably, step 401 may be:

when uplink data reaches the PDCP entrance, checking the memory usage of the PDCP buffer in real time at the PDCP entrance, and determining whether the memory usage of the PDCP buffer is greater than or equal to the preset threshold of the PDCP buffer; or, when downlink data reaches the MAC entrance, checking the memory usage of the MAC buffer at the MAC entrance, and determining whether the memory usage of the MAC buffer is greater than or equal to the preset threshold of the MAC buffer; or, when uplink data/downlink data reaches the RLC entrance, checking the memory usage of the RLC buffer at the RLC entrance, and determining whether the memory usage of the RLC buffer is greater than or equal to the preset threshold of the RLC buffer.

402: If it is determined that the memory usage of the buffer is greater than or equal to the preset threshold in step 401, release the memory of the buffer of the data link layer.

This step includes: if the memory usage of the PDCP buffer is determined to be greater than or equal to the preset threshold of the PDCP buffer, releasing the memory of the PDCP buffer or releasing the memories of all the buffers (including the PDCP buffer, MAC buffer, and RLC buffer) of the data link layer;

if the memory usage of the MAC buffer is determined to be greater than or equal to the preset threshold of the MAC buffer, releasing the memory of the MAC buffer or releasing the memories of all the buffers (including the PDCP buffer, MAC buffer, and RLC buffer) of the data link layer;

if the memory usage of the RLC buffer is determined to be greater than or equal to the preset threshold of the RLC buffer, releasing the memory of the RLC buffer or releasing the memories of all the buffers (including the PDCP buffer, MAC buffer, and RLC buffer) of the data link layer.

The solution of the present invention is not only applicable to the LIE system but also applicable to WCDMA and TD-SCDMA systems for recovering the memory of a user plane buffer.

By using the method for recovering the memory of the user plane buffer according to this embodiment of the present invention, a threshold is set for the memory usage of the buffer, and the threshold is smaller than the memory capacity of the buffer, so that when the memory usage of the buffer reaches or exceeds the threshold, the memory of the buffer is released. However, in the prior art, the memory of the buffer is released only in a case that the buffer overflows and a related timer expires. Compared with the prior art, the solution of the present invention has a simpler procedure and can recover the memory of the user plane buffer immediately and quickly.

The following gives a detailed illustration of the method for recovering the buffer of the data link layer of the UE in a process of communication between a UE and a NodeB.

Figure 5:
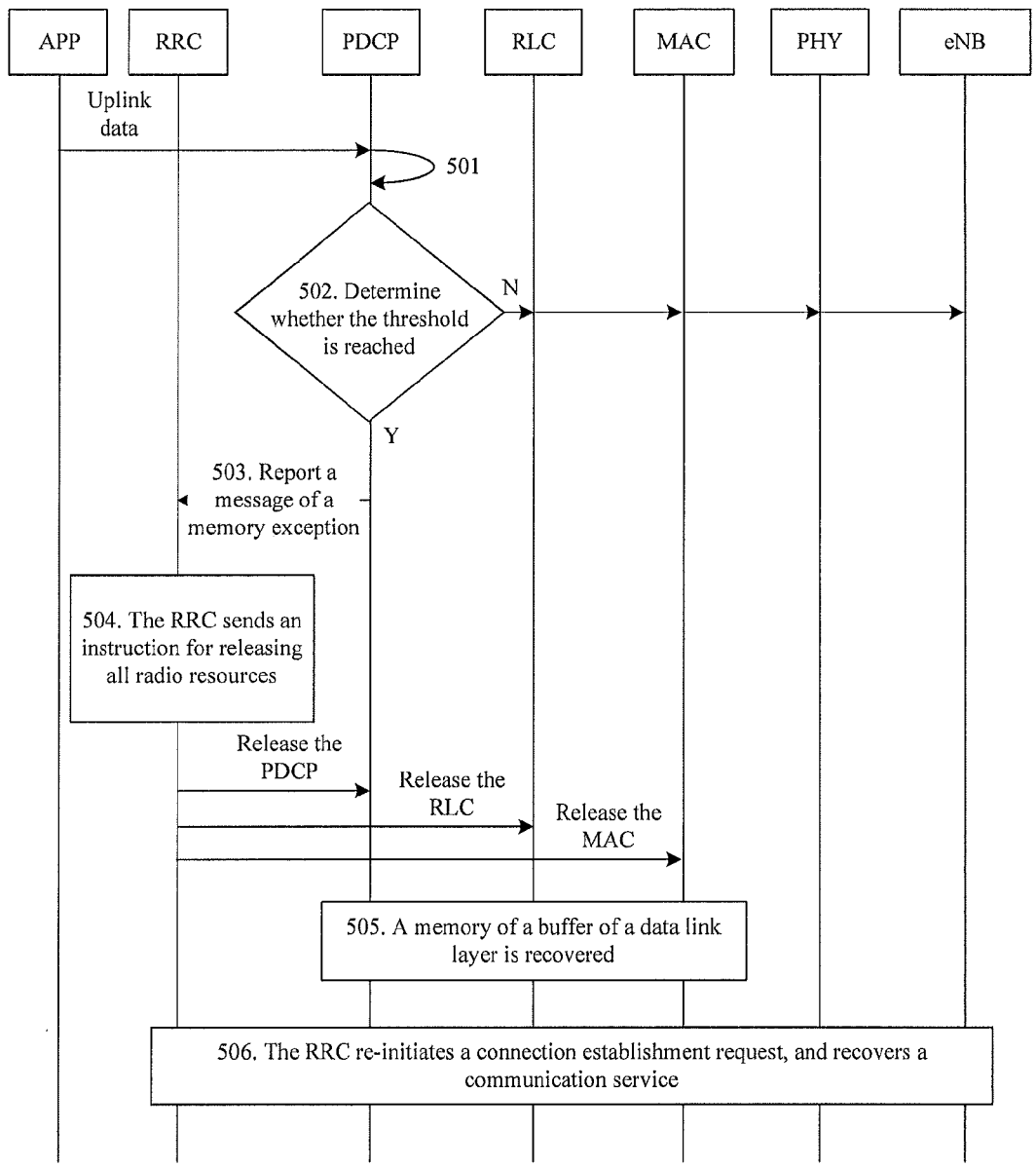
FIG. 5 is a flowchart of a method for recovering a memory of a user plane buffer according to an embodiment of the present invention.

As shown in FIG. 5, an embodiment of the present invention provides a method for recovering the memory of a user plane buffer in a process of sending uplink data by a UE to a NodeB. In this method, a case that a data link layer shares a buffer is taken for example, where a threshold is preset for the memory usage of the buffer of the data link layer, and the threshold is smaller than the memory capacity of the buffer of the data link layer. The method provided in this embodiment includes the following steps:

501: An APP (Application Layer, application layer) of the UE sends uplink data to the NodeB; when the uplink data reaches a PDCP entrance, check the memory usage of the buffer of the data link layer.

502: Determine whether the memory usage of the buffer of the data link layer is greater than or equal to the preset threshold.

If it is determined that the memory usage of the buffer of the data link layer is greater than or equal to the preset threshold, perform step 503.

If it is determined that the memory usage of the buffer of the data link layer is not greater than or equal to the preset threshold, the uplink data is normally delivered to the RLC for processing.

503: The PDCP reports a message of a buffer memory exception to the RRC (Radio Resource Control, radio resource control).

504: After receiving the message of the buffer memory exception, the RRC sends an instruction for releasing all radio resources.

505: After receiving the instruction sent in step 504, the data link layer releases, as described in section 5.3.12 of 3GPP TS 36.331, all the radio resources of the data link layer, and specifically, releases MAC configurations and all RLC entities and PDCP entities that have set up RBs. That is, radio resources occupied by the MAC configurations, the RLC entities and PDCP entities are released, and definitely, memories of the buffers of the data link layer, where the memories of the buffers of the data link layer is occupied by the MAC configurations, RLC entities, and PDCP entities, are released, that is, the memory of the buffer of the data link layer is recovered.

Because data interaction may be interrupted for a short while in the process of releasing radio resources, after the memory of the data link layer is recovered, this method may further include step 506.

506: The RRC re-initiates a connection establishment request, and recovers a communication service.

Figure 6:
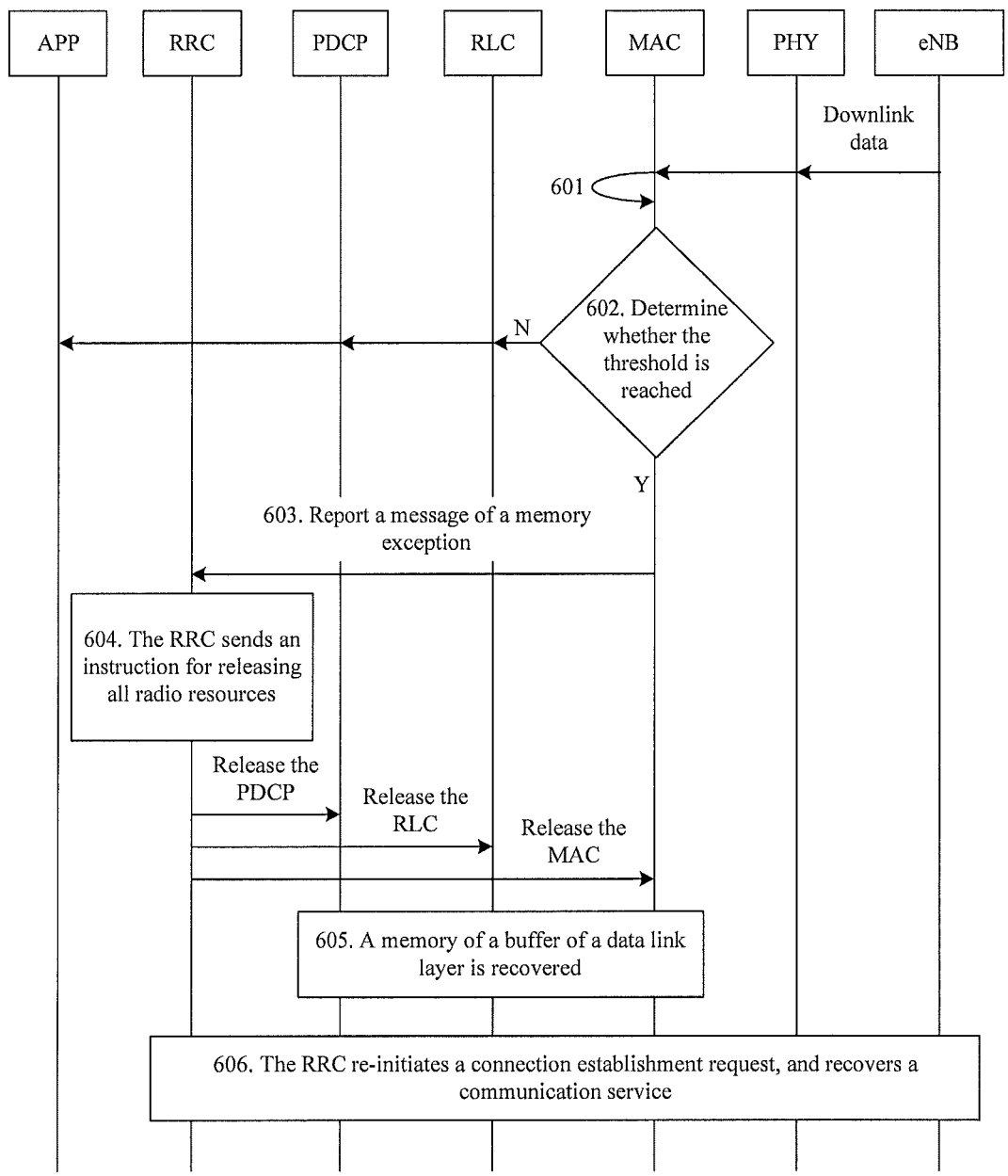
FIG. 6 is a flowchart of another method for recovering a memory of a user plane buffer according to an embodiment of the present invention.

As shown in FIG. 6, an embodiment of the present invention provides a method for recovering the memory of a user plane buffer in a process of sending downlink data by a NodeB to a UE. In this method, a case that a data link layer shares a buffer is taken for example, where a threshold is preset for the memory usage of the buffer of the data link layer, and the threshold is smaller than the memory capacity of the buffer of the data link layer. The method provided in this embodiment includes the following steps:

601: The NodeB sends the downlink data to the UE; when the downlink data reaches a MAC entrance, check the memory usage of the buffer of the data link layer.

602: Determine whether the memory usage of the buffer of the data link layer is greater than or equal to the preset threshold.

If it is determined that the memory usage of the buffer of the data link layer is greater than or equal to the preset threshold, perform step 603.

If it is determined that the memory usage of the buffer of the data link layer is not greater than or equal to the preset threshold, the downlink data is normally delivered to the RLC for processing.

603: The MAC reports a message of a buffer memory exception to the RRC.

604: After receiving the message of the buffer memory exception, the RRC sends an instruction for releasing all radio resources.

605: After receiving the instruction sent in step 604, the data link layer releases, as described in section 5.3.12 of 3GPP TS 36.331, all radio resources of the data link layer, and specifically, releases MAC configurations and all the RLC entities and PDCP entities that have set up RBs. In this case, the memory of the buffer of the data link layer is recovered.

606: The RRC re-initiates a connection establishment request, and recovers communication services.

Figure 7:
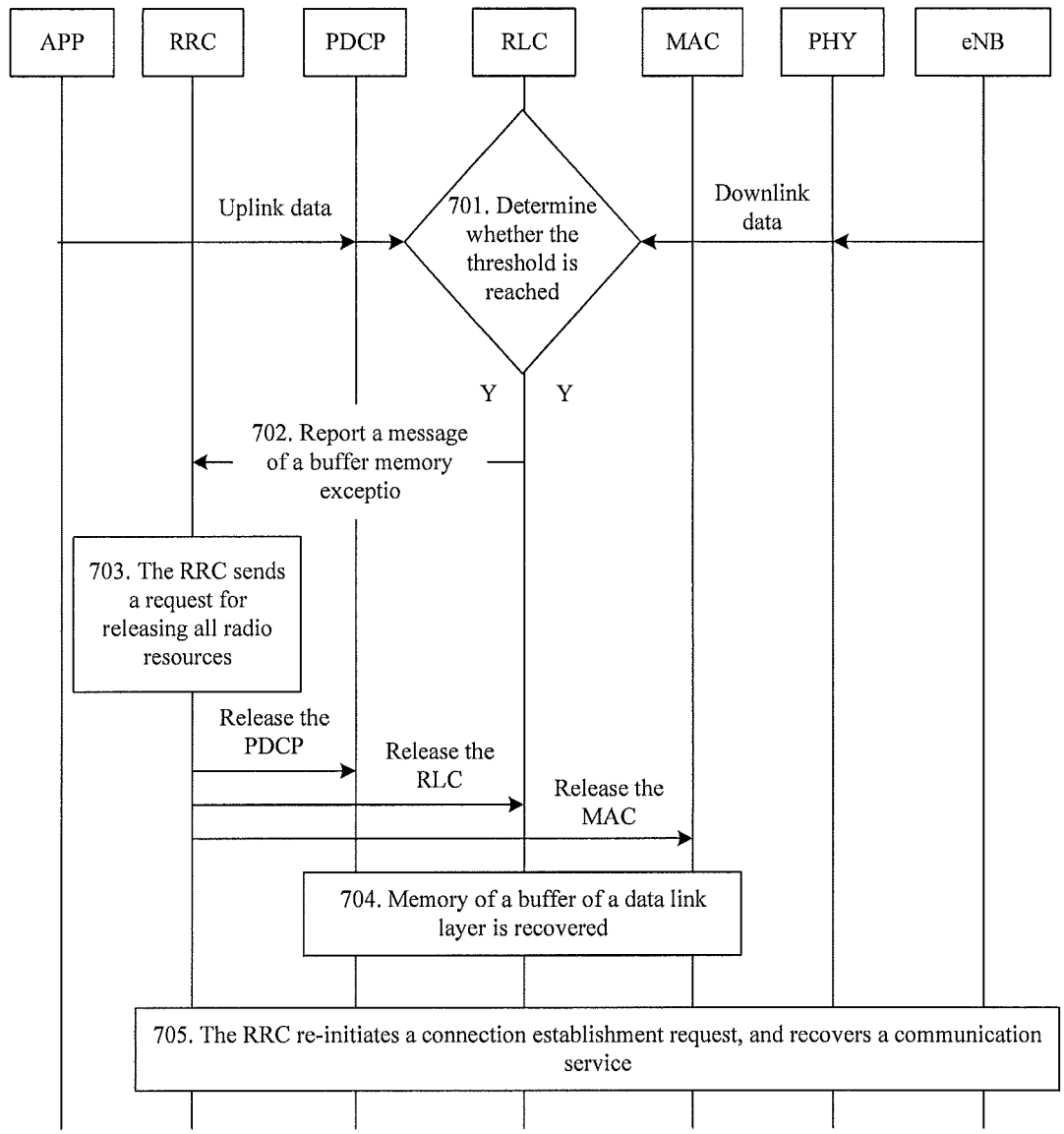
FIG. 7 is a flowchart of still another method for recovering a memory of a user plane buffer according to an embodiment of the present invention.

As shown in FIG. 7, memory usage of a buffer of a data link layer may also be detected at an RLC entrance. An embodiment of the present invention provides a method for recovering the memory of a user plane buffer in this case. In this method, a case that the data link layer shares a buffer is taken for example, where a threshold is preset for the memory usage of the buffer of the data link layer, and the threshold is smaller than the memory capacity of the buffer of the data link layer. The method provided in this embodiment includes the following steps:

701: When uplink data reaches the RLC entrance, check the memory usage of the buffer of the data link layer, and determine whether the memory usage of the buffer of the data link layer is greater than or equal to the preset threshold.

If it is determined that the memory usage of the buffer of the data link layer is greater than or equal to the preset threshold, perform step 702.

If it is determined that the memory usage of the buffer of the data link layer is not greater than or equal to the preset threshold, the uplink data is normally delivered to the MAC for processing.

Alternatively, when downlink data reaches the RLC entrance, check the memory usage of the buffer of the data link layer, and determine whether the memory usage of the buffer of the data link layer is greater than or equal to the preset threshold.

If it is determined that the memory usage of the buffer of the data link layer is greater than or equal to the preset threshold, perform step 702.

If it is determined that the memory usage of the buffer of the data link layer is not greater than or equal to the preset threshold, the downlink data is normally delivered to the RRC for processing.

702: The RLC reports a message of a buffer memory exception to the RRC immediately.

703: After receiving the message of the buffer memory exception, the RRC sends an instruction for releasing all radio resources.

704: After receiving the instruction sent in step 703, the data link layer releases, as described in section 5.3.12 of 3GPP TS 36.331, all radio resources of the data link layer, and specifically, releases MAC configurations and all the RLC entities and PDCP entities that have set up RBs. In this case, the memory of the buffer of the data link layer is recovered.

705: The RRC re-initiates a connection establishment request, and recovers communication services.

By using the methods provided in the foregoing embodiments of the present invention, the memory usage of the buffer of the data link layer is checked at the PDCP entrance, MAC entrance, and RLC entrance of the data link layer; when the memory usage of the buffer is determined to be greater than or equal to a preset threshold, a message of a buffer memory exception is reported to the RRC. Thereby, the RRC is enabled to control the releasing of the memory of the buffer of the data link layer, that is, the memory of the buffer can be recovered immediately and quickly.

Figure 8:
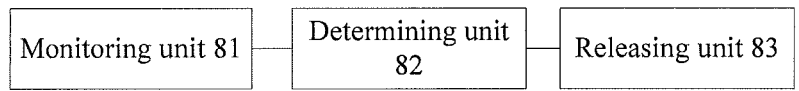
FIG. 8 is a block diagram of an apparatus for recovering a memory of a user plane buffer according to an embodiment of the present invention.

Corresponding to the above methods, an apparatus for recovering a memory of a user plane buffer is provided in an embodiment of the present invention. The apparatus may be a functional module of a UE or a functional module of a NodeB. As shown in FIG. 8, the apparatus includes:

a monitoring unit 81, configured to monitor memory usage of a buffer in real time;

a determining unit 82, configured to determine whether the memory usage of the buffer is greater than or equal to a preset threshold, where the preset threshold is smaller than the memory capacity of the buffer; and a releasing unit 83, configured to release the memory of the buffer in a case that the determining result of the determining unit is true.

The apparatus for recovering the memory of the user plane buffer according to this embodiment of the present invention set a threshold for the memory usage of the buffer, where the threshold is smaller than the memory capacity of the buffer, so that when the memory usage of the buffer reaches or exceeds the threshold, the memory of the buffer is released. However, in the prior art, the memory of the buffer is released only in a case that the buffer overflows and a related timer expires. Compared with the prior art, the solution of the present invention has a simpler procedure and can recover the memory of the user plane buffer immediately and quickly.

Preferably, the monitoring unit 81 is configured to monitor the memory usage of the buffer of a data link layer at an uplink data entrance or a downlink data entrance or another entrance of the data link layer in real time.

The uplink data entrance is a Packet Data Convergence Protocol, PDCP, entrance; the downlink data entrance is a medium access control, MAC, entrance; and the other entrance includes a radio link control, RLC, entrance.

Preferably, the monitoring unit 81 includes:

a first monitoring subunit, configured to check the memory usage of the buffer of the data link layer at the uplink data entrance when uplink data reaches the uplink data entrance of the data link layer; or, a second monitoring subunit, configured to check the memory usage of the buffer of the data link layer at the downlink data entrance when downlink data reaches the downlink data entrance of the data link layer; or, a third monitoring subunit, configured to check the memory usage of the buffer of the data link layer at the other entrance when uplink data/downlink data reaches the other entrance of the data link layer.

Preferably, the releasing unit 83 includes:

a reporting subunit, configured to report a message of a buffer memory exception to the RRC in a case that the determining result of the determining unit is true;

a sending subunit, configured for the RRC to send an instruction for releasing all radio resources, after the RRC receives the message of the buffer memory exception; and a releasing subunit, configured to: in a case that the data link layer receives the instruction, release all radio resources of the data link layer, including MAC configurations and all RLC and PDCP entities that have set up RBs.

The apparatus provided in the embodiment of the present invention may check the memory usage of the buffer of the data link layer at the PDCP entrance, MAC entrance, and RLC entrance of the data link layer; and when the memory usage of the buffer is determined to be greater than or equal to the preset threshold, report the message of the buffer memory exception to the RRC. Thereby, the RRC is enabled to control the releasing of the memory of the buffer of the data link layer, that is, the memory of the buffer can be recovered immediately and quickly.

Through the preceding description of the embodiments, those skilled in the art can clearly understand that the present invention may be implemented by software in addition to a necessary universal hardware platform or by hardware only. In most circumstances, the former is preferred. Based on such understanding, the essence of the technical solution of the present invention, or the portions contributing to the prior art may be embodied in the form of a software product. The computer software product is stored in a readable storage medium, such as a floppy disk, a hard disk, or an optical disk in a computer, and includes several instructions to instruct a device (which may be a personal computer, a server, or a network device) to execute the method described in each embodiment of the present invention.

Detailed above are only exemplary embodiments of the present invention, but the scope of the present invention is not limited thereto. Any modification or substitution readily conceivable by those skilled in the art within the scope of the technology disclosed in the present invention shall fall within the scope of the present invention. Therefore, the protection scope of the present invention is subject to the protection of the appended claims.

What is claimed is:

1. A method for recovering a memory of a user plane buffer, comprising:

monitoring memory usage of a buffer in real time, comprising monitoring memory usage of a buffer of a data link layer in real time; and when the memory usage of the buffer is greater than or equal to a preset threshold, releasing the memory of the buffer and releasing radio resources, wherein the preset threshold is smaller than a memory capacity of the buffer.

2. The method according to claim 1, wherein the monitoring the memory usage of the buffer in real time comprises:

monitoring memory usage of a buffer of a data link layer in real time at an uplink data entrance or a downlink data entrance or another entrance of the data link layer.

3. A method for recovering a memory of a user plane buffer, comprising:

monitoring memory usage of a buffer in real time; and when the memory usage of the buffer is greater than or equal to a preset threshold, releasing the memory of the buffer, wherein the preset threshold is smaller than a memory capacity of the buffer, wherein the monitoring the memory usage of the buffer in real time comprises:

monitoring memory usage of a buffer of a data link layer in real time at an uplink data entrance or a downlink data entrance or another entrance of the data link layer, wherein the monitoring the memory usage of the buffer of the data link layer in real time at the uplink data entrance or the downlink data entrance or the another entrance of the data link layer comprises:

when uplink data reaches the uplink data entrance of the data link layer, checking the memory usage of the buffer of the data link layer at the uplink data entrance; or, when downlink data reaches the downlink data entrance of the data link layer, checking the memory usage of the buffer of the data link layer at the downlink data entrance; or, when uplink data/downlink data reaches the other entrance of the data link layer, checking the memory usage of the buffer of the data link layer at the other entrance.

4. The method according to claim 3, wherein the uplink data entrance is a Packet Data Convergence Protocol (PDCP) entrance; the downlink data entrance is a medium access control (MAC) entrance; and the other entrance comprises a radio link control (RLC) entrance.

5. A method for recovering a memory of a user plane buffer, comprising:

monitoring memory usage of a buffer in real time; and when the memory usage of the buffer is greater than or equal to a preset threshold, releasing the memory of the buffer, wherein the preset threshold is smaller than a memory capacity of the buffer, wherein when the memory usage of the buffer is greater than or equal to the preset threshold, the releasing the memory of the buffer comprises:

when the memory usage of the buffer is greater than or equal to the preset threshold, reporting a message of a buffer memory exception to radio resource control (RRC);

after the RRC receives the message of the buffer memory exception, sending, by the RRC, an instruction for releasing all radio resources; and after a data link layer receives the instruction, releasing all radio resources of the data link layer, including medium access control (MAC) configurations, and all radio link control (RLC) entities and Packet Data Convergence Protocol (PDCP) entities that have set up radio bearers (RBs).

6. An apparatus for recovering a memory of a user plane buffer, comprising:
  a monitoring unit, configured to monitor memory usage of a buffer in real time, comprising monitoring memory usage of a buffer of a data link layer in real time;
  a determining unit, configured to determine whether the memory usage of the buffer is greater than or equal to a preset threshold, wherein the preset threshold is smaller than a memory capacity of the buffer; and
  a releasing unit, configured to release the memory of the buffer and to send an instruction to release radio resources in a case that the memory usage of the buffer is greater than or equal to a preset threshold.

7. The apparatus according to claim 6, wherein the monitoring unit is configured to monitor the memory usage of the buffer of a data link layer in real time at an uplink data entrance or a downlink data entrance or another entrance of the data link layer.

8. An apparatus for recovering a memory of a user plane buffer, comprising:
  a monitoring unit, configured to monitor memory usage of a buffer in real time;
  a determining unit, configured to determine whether the memory usage of the buffer is greater than or equal to a preset threshold, wherein the preset threshold is smaller than a memory capacity of the buffer; and
  a releasing unit, configured to release the memory of the buffer in a case that the memory usage of the buffer is greater than or equal to a preset threshold, wherein the monitoring unit is configured to monitor the memory usage of the buffer of a data link layer in real time at an uplink data entrance or a downlink data entrance or another entrance of the data link layer, wherein the monitoring unit comprises:
    a first monitoring subunit, configured to check the memory usage of the buffer of the data link layer at the uplink data entrance when uplink data reaches the uplink data entrance of the data link layer; or,
    a second monitoring subunit, configured to check the memory usage of the buffer of the data link layer at the downlink data entrance when downlink data reaches the downlink data entrance of the data link layer; or,
    a third monitoring subunit, configured to check the memory usage of the buffer of the data link layer at the other entrance when uplink data/downlink data reaches the other entrance of the data link layer.

9. The apparatus according to claim 8, wherein the uplink data entrance is a Packet Data Convergence Protocol (PDCP) entrance; the downlink data entrance is a medium access control (MAC) entrance; and the other entrance comprises a radio link control (RLC) entrance.

10. An apparatus for recovering a memory of a user plane buffer, comprising:
  a monitoring unit, configured to monitor memory usage of a buffer in real time;
  a determining unit, configured to determine whether the memory usage of the buffer is greater than or equal to a preset threshold, wherein the preset threshold is smaller than a memory capacity of the buffer; and
  a releasing unit, configured to release the memory of the buffer in a case that the memory usage of the buffer is greater than or equal to a preset threshold, wherein the releasing unit comprises:
    a reporting subunit, configured to report a message of a buffer memory exception to radio resource control (RRC) when the memory usage of the buffer is greater than or equal to a preset threshold;
    a sending subunit, configured for the RRC to send an instruction for releasing all radio resources, after the RRC receives the message of the buffer memory exception; and
    a releasing subunit, configured to: in a case that a data link layer receives the instruction, release all radio resources of the data link layer, including medium access control (MAC) configurations, and all radio link control (RLC) entities and Packet Data Convergence Protocol (PDCP) entities that have set up radio bearers (RBs).

* * * * *